March 25, 1941. W. P. GOODENOUGH ET AL 2,236,313
CLUTCH
Filed March 31, 1939
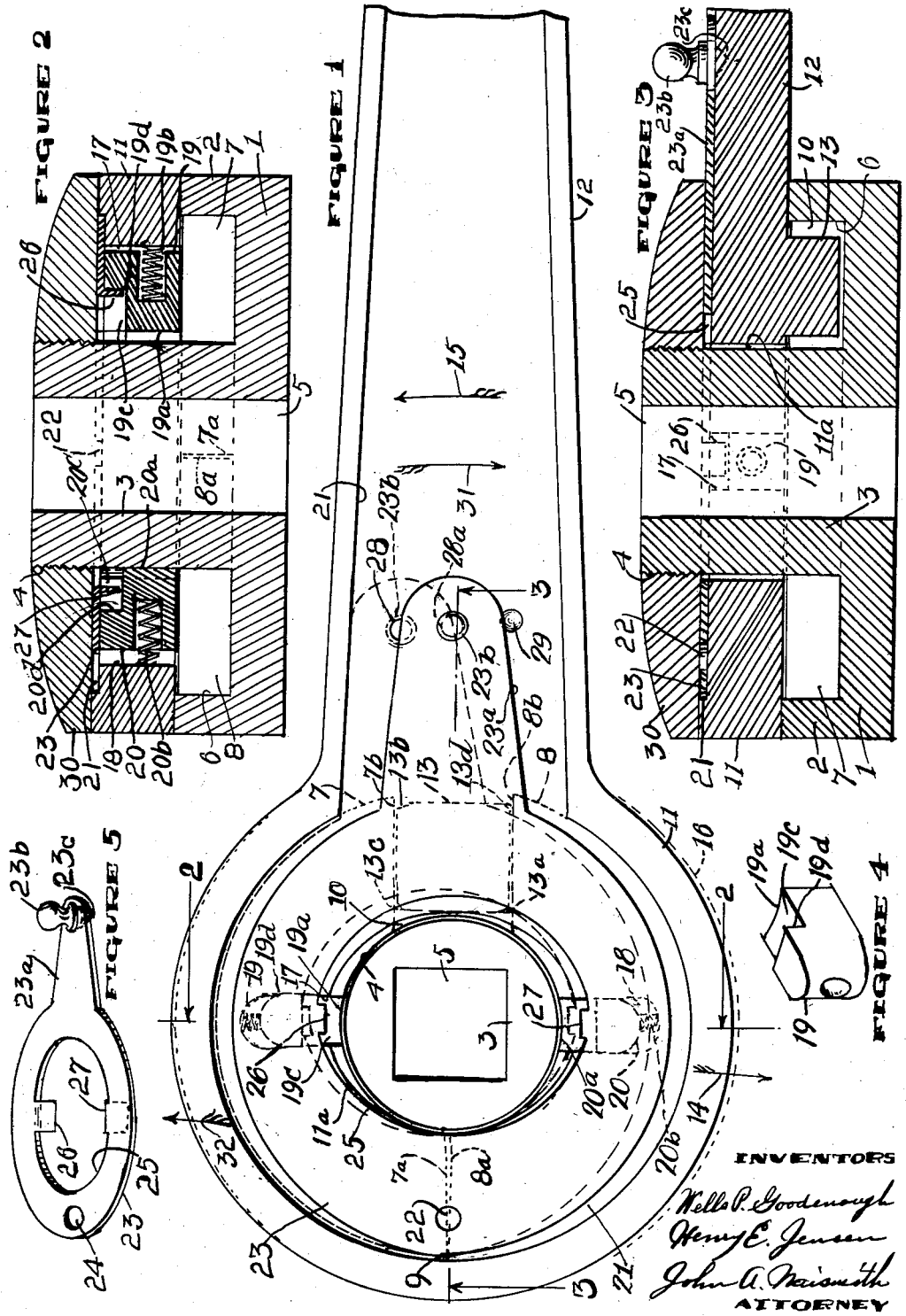
INVENTORS
Wells P. Goodenough
Henry E. Jensen
John A. Naismith
ATTORNEY Patented Mar. 25, 1941

2,236,313

UNITED STATES PATENT OFFICE 2,236,313

CLUTCH

Wells P. Goodenough and Henry E. Jensen, Palo Alto, Calif.

Application March 31, 1939, Serial No. 265,253

10 Claims. (Cl. 192—43)

The present application is a continuation in part of our application for a patent for an improvement in Clutches filed August 10, 1938, bearing Serial No. 224,089.

The present application relates to a clutch applicable to machinery of various types where precision is required in the step-by-step movement of machine parts or work operated upon, and to various types of tools such as wrenches.

In the operation of machines where it is necessary for a shaft to rotate intermittently through definite fixed arcs, for instance, it has heretofore been customary to effect the driving of the shaft by means of various arrangements of gears. While such mechanism may be accurate and positive when first put into use, the fine accuracy desired is soon lost because of lost motion developed through the wearing of contacting surfaces. Likewise in certain tools, as a wrench, there is lost motion in adjustment and in operation, particularly in the type designed for use in limited space.

It is one object of the present invention to provide a clutch so constructed and arranged that it may be used to apply power to a part to be rotated without any loss of motion whatever, and that will maintain this characteristic throughout its active life.

It is another object of the invention to provide a device of the character indicated that may be quickly and easily moved in the reverse to its operative direction without developing any lost motion to interfere with its prompt and accurate action when power is again applied to move it in its operative direction.

It is a further object of the invention to provide a clutch of the character indicated and including frictionally engaging driving and driven members, wherein the frictional engagement of the said parts may be quickly, easily, and positively relieved without the development of lost motion, to permit rotation of the driving member in an inoperative direction.

It is still another object of the invention to provide a clutch of the character indicated that may be quickly and easily adjusted for the application of power in either direction without the necessity of removing it from its working position.

Finally, it is an object of the invention to provide means of the character indicated that is economical to manufacture, that consists of few and simple parts, that is simple in form and construction, strong and durable, positive in operation, and highly efficient in its practical application.

In the drawing:

Figure 1 is a plan view of a device embodying our invention with the cap removed and with a part broken away and the parts in a neutral position.

Figure 2 is a section on line 2—2 of Figure 1 but showing the parts in the engaged position.

Figure 3 is a section on line 3—3, Figure 1.

Figure 4 is a perspective view of one of the adjusting shoes.

Figure 5 is a perspective view of the adjusting lever.

In the particular embodiment of the invention herein disclosed we show at 1 a disc having at 2 a circular peripheral flange, and at 3 an axially disposed hub portion disposed on the same side of the disc as the flange and threaded on its outer end as at 4. The passage 5 passing axially through the hub portion 3 is to provide means whereby the device may be fitted with a tool or mounted upon a shaft for any desired purpose.

In the annular space 6 between the flange 2 and the hub portion 3 are placed two clutch members or shoes as 7 and 8.

Each clutch member is substantially semi-circular in form and has sliding engagement with the flange 2. These clutch members or shoes are identical in form and size and are placed in the space 6 with their ends 7a and 8a in contact at 9, their other ends as 7b and 8b being spaced apart to form a pocket 10, diametrically opposite the point 9.

At 11 is shown a flat disc, circular in form and having an outside diameter equal to that of disc 1 and provided with a handle 12. On the under side of the disc 11 is formed a boss 13, and this boss is of such a size and so positioned as to fit in and substantially fill the pocket 10. This boss is designed to function as a spreader and fits in the pocket 10 so closely that if the lever 11—12 is turned slightly on the boss 13 as a pivot it operates to bring opposite corners of the boss into engagement with opposing ends 7b, 8b of the clutch shoes.

If, for instance, with the member 23 in the dotted line position of Fig. 1, the disc 11 is pushed in the direction indicated by arrow 14 the corners 13a and 13b are caused to bear against the ends 7b and 8b of the clutch shoes and press the said clutch shoes tightly against the flange 2 so that the part 1—4 will turn as a unit with the lever 11—12 when power is applied to the handle in the direction indicated by arrow 15. The swinging movement of disc 11 relative to the underlying disc 1 is slight because the shoes 7—8 fit closely in the flange 2 and the boss 13 fits closely between the ends of the clutch shoes. The displacement of the disc 11 relative to the disc 1 when the parts are adjusted as above described is shown at 16.

The disc 11 has diametrically opposite slots as 17 and 18 formed therein. These slots extend through the thickness of the disc and have open communication with its inner periphery which defines an oblong or oval central opening 11a, encompassing hub 3. The slots 17—18 are aligned with the major axis of the opening 11a, and this axis is at right angles to the longitudinal axis of lever 11—12. While we have shown the slots 17, 18 as being diametrically opposite to each other, it is obvious that they need not be exactly opposite to function properly.

Disposed in each slot 17 and 18 and slidably engaging the underlying clutch shoes 7—8 are slidable elements 19 and 20. Each slidable element slides snugly in its slot, one end as 19a of slidable element 19 being urged into contact with the hub 3 by a spring 19b inserted between the slidable element and the closed end of the slot. The top inner portion of each slidable element, as 19, is provided with a recess as 19c to form a shoulder as at 19d for the purpose hereinafter described.

In the top or upper side of the lever 11—12 is formed a recess 21, and disposed in this recess is a pivot pin 22. The pin 22 is disposed at a point on the lever adjacent the edge remote from handle 12 and lies in the plane bisecting the lever longitudinally at right angles to the plane of its movement.

At 23 is shown a thin adjusting disc or lever having a thickness substantially equal to the depth of the recess 21 and having pivotal engagement with the pin 22 as shown at 24. The member 23 has a large opening 25 formed therein so that it may lay flat in the recess 21 and yet move freely thereon without contacting the hub 3. Formed on diametrically opposite sides of the opening 25 are depending fingers 26—27, these fingers being so spaced and disposed as to engage shoulders 19d and 20d on slidable elements 19 and 20 and press them back against the urge of the springs 19b and 20b when the member 23 is swung in one direction or the other about its pivotal point 22. The disc 23 is provided with an arm 23a and a handle 23b, and is also provided with a projection 23c on the underside of the arm 23a to engage spaced sockets as 28, 28a and 29 in handle 12.

A cap member 30 is screwed into position on the hub 3 to seat on the outer edge of member 11 as shown and thereby securely hold the assembled parts in their proper relative positions.

When the device is adjusted as hereinbefore described and the member 23 is moved from the neutral position shown to the broken line position of Fig. 1, the projection 23c will engage the socket 28, finger 26 will hold the slidable member 19 in a retracted position, slidable member 20 will be pressed against the hub 3 and through the medium of spring 20b will push the disc 11 in the direction of arrow 14, the corners 13a and 13b of boss 13 will press outwardly on the adjacent ends of the clutch shoes 7 and 8 and force them into intimate contact with the flange 2 because they are fulcrumed on each other at 9. Movement of the handle 12 as indicated by arrow 15 will move all of the parts as a unit because power applied in that direction tends to increase the pressure at 13a and 13b, but if the direction of the application of power is reversed as indicated by the arrow 31, then the disc 11 tends to move back against the resistance of spring 20b and removes the spreading pressure on the clutch shoes at 13a—13b. Since the member 13 now exerts no spreading action the clutch shoes slide freely in the flange 2 and no power is transmitted thereto.

If the arm 23a is now moved over to a position where projection 23c engages socket 29, then the positions of the several parts are reversed. Then finger 27 holds slidable element 20 in a retracted position, slidable element 19 is pressed against the hub 3 and through the medium of spring 19b is pushing the disc 11 in the direction of arrow 32. This position of disc 11 causes the corners 13c and 13d to bear against the adjacent ends of the clutch shoes 7—8 and force them into intimate contact with the flange 2, so that movement of the handle 12 in the direction indicated by arrow 31 will move all of the parts as a unit, while its movement in the opposite direction will merely cause the clutch shoes to slide in the flange as above described. Of course, when the arm 23a is in the Fig. 1 position with the projection 23c engaged in socket 28a, the device is completely disengaged and movement of the handle 12 in either direction will not result in rotation of the driven parts.

Although a certain specific embodiment of the invention has been illustrated and described, it will be understood that various alterations in the details of construction and mode of assembly may be made without departing from the scope of the invention as indicated in the accompanying claims.

We claim:

1. A clutch comprising, a revoluble member having an annular internal bearing surface, a pair of opposed shoes disposed to bear against substantially opposed portions of said surface and fulcrumed at one end, a cam inserted between the other ends of said shoes to spread the same, a lever operable as a unit with the cam to actuate the same, and resilient means engaging the lever and the revoluble member and operative to maintain the cam in a position to spread said shoes.

2. A clutch comprising, a revoluble member having an annular internal bearing surface, a pair of opposed shoes disposed to bear against substantially opposed portions of said surface and fulcrumed at one end, a cam inserted between the other ends of the shoes and constructed and arranged whereby diametrically opposite points will contact the shoes when the cam is adjusted in either direction about its axis, a lever operable as a unit with the cam to adjust the same and in part overlying the shoes, and resilient means inserted between the overlying part of the lever and the revoluble member and constantly urging one pair of diametrically opposite points on the cam into contact with the shoes to spread the same into operative engagement with said bearing surface.

3. A clutch comprising, a revoluble member having an internal bearing surface and a concentrically disposed central portion, a pair of shoes disposed in the space between the surface and central portion to bear against substantially opposed portions of said surface and fulcrumed at one end, a cam inserted between the other ends of said shoes and constructed and arranged to bring diametrically opposite points into contact with the shoes when moved in either direction about its axis, a lever operable as a unit with the cam to adjust the same and in part overlying the shoes, resiliently supported elements inserted between the lever and opposite sides of the central portion of the revoluble member selectively operative to shift the lever and cam relative to the revoluble member, and instrumentalities operative to render one of said resiliently supported elements inoperative.

4. A clutch comprising, a revoluble member having an internal bearing surface and a concentrically disposed central portion, a pair of shoes disposed in the space between the surface and central portion to bear against substantially opposed portion of said surface and fulcrumed at one end, a cam inserted between the other ends of said shoes and constructed and arranged to bring diametrically opposite points into contact with the shoes when moved in either direction about its axis, a lever operable as a unit with the cam to move the same in either direction and in part overlying the shoes, resiliently supported elements inserted between the lever and opposite sides of the central portion of the revoluble member selectively operative to shift the lever and cam relative to the revoluble member and press the shoes into engagement with the revoluble member, and an adjusting lever fulcrumed on the first named lever and having parts engageable with said resiliently supported elements whereby either element may be moved to an inoperative position against the urge of its resilient support.

5. A clutch comprising, a revoluble member having an internal bearing surface and a concentrically disposed central portion, a pair of shoes disposed in the space between the said surface and central portion to bear against substantially opposed portion of said surface and fulcrumed at one end, a cam inserted between the other ends of said shoes and constructed and arranged to bring diametrically opposite points into contact with the shoes when moved in either direction about its axis, a lever operable as a unit with the cam to move the same in either direction and in part overlying the shoes, and having aligned and radially disposed recesses formed therein in opposed relation to the central portion of the revoluble member, an element resiliently supported in each recess to bear against said central portion, and an adjusting lever fulcrumed on the first named lever and overlying the shoes and having parts engaging said elements whereby movement of the lever in either direction will move one of said elements out of engagement with the said central portion.

6. A clutch comprising, a revoluble member having an internal bearing surface and a concentrically disposed central portion, a pair of shoes disposed in the space between the surface and central portion to bear against substantially opposed portions of said surface and fulcrumed at one end, an adjustable spreader inserted between the other ends of said shoes, a lever operable as a unit with the spreader to adjust the same and in part overlying the shoes, at least one resilient means inserted between the lever and the central portion of the revoluble member operable to shift the lever and spreader relative to the revoluble member and thereby adjust the spreader to urge the shoes into intimate contact with the revoluble member, and instrumentalities operative to render the said resilient means inoperative.

7. A clutch, comprising driven and driving parts and clutch shoes connecting said parts together for mutual rotation in one direction while permitting relative rotation in the opposite direction, one of said parts including an annular internal bearing surface, said shoes comprising segments fulcrummed on each other at one end and spaced apart at the other end, said shoes having peripheral surfaces adapted to bear against said annular bearing surface, a spreader associated with the other part and interposed between the spaced ends of said shoes for actuating said shoes into engagement with said annular bearing surface, and at least one resilient means engaging both of said parts and moving said second part and said spreader to actuate said shoes into engagement with said bearing surface to lock said parts together for mutual rotation in one direction while permitting relative rotation in the opposite direction.

8. The structure of claim 7, and means for disengaging said resilient means from said first part.

9. The structure of claim 7, and said spreader comprising a cam integral with said second part.

10. The structure of claim 7, further resilient means engageable with both of said parts to move said spreader in an opposite direction to actuate said shoes to lock said parts together for mutual rotation in said opposite direction, and means for selectively disengaging one of said resilient means from said first part to permit the other resilient means to engage said first part and actuate said second part as aforesaid.

WELLS P. GOODENOUGH.
HENRY E. JENSEN.